United States Patent [19]

Bains

[11] 4,144,689
[45] Mar. 20, 1979

[54] JOINT FOR INTERCONNECTING PANELS
[75] Inventor: Gurdip S. Bains, Bonneauville, Pa.
[73] Assignee: Westinghouse Electric Corp., Pittsburgh, Pa.
[21] Appl. No.: 880,538
[22] Filed: Feb. 23, 1978
[51] Int. Cl.² .............................................. E04B 2/00
[52] U.S. Cl. ..................................... 52/285; 403/231; 403/363; 403/374
[58] Field of Search ............... 403/363, 297, 110, 104, 403/409, 367, 368, 374; 52/584, 586, 284, 285; 85/79

[56] References Cited

U.S. PATENT DOCUMENTS

| 2,192,048 | 2/1940 | Mueller ................................ 403/297 |
| 2,686,700 | 8/1954 | McCarran ........................ 403/104 X |
| 3,363,386 | 1/1968 | Elflein et al. ............................ 52/586 |
| 3,469,873 | 9/1969 | Glaros ................................ 52/586 X |
| 3,516,698 | 6/1970 | Didry ................................ 403/363 |
| 3,528,691 | 9/1970 | Matich, Jr. .......................... 85/79 X |

FOREIGN PATENT DOCUMENTS 2120449 12/1971 Fed. Rep. of Germany ............. 52/586
23795 2/1950 Finland ..................................... 52/586

Primary Examiner—Andrew V. Kundrat
Attorney, Agent, or Firm—D. R. Lackey

[57] ABSTRACT

A joint between first and second adjacent panel members, including first and second cooperatively bent members on the adjoining edges of the first and second panel members, respectively. The bent members are coupled to define an open ended, vertically extending cavity, having a substantially rectangular configuration in horizontal section. An expandable locking device is inserted into the cavity, which device applies pressure to opposite corners of the cavity substantially along the entire length thereof, to provide and maintain a tight joint between the panel members.

8 Claims, 10 Drawing Figures

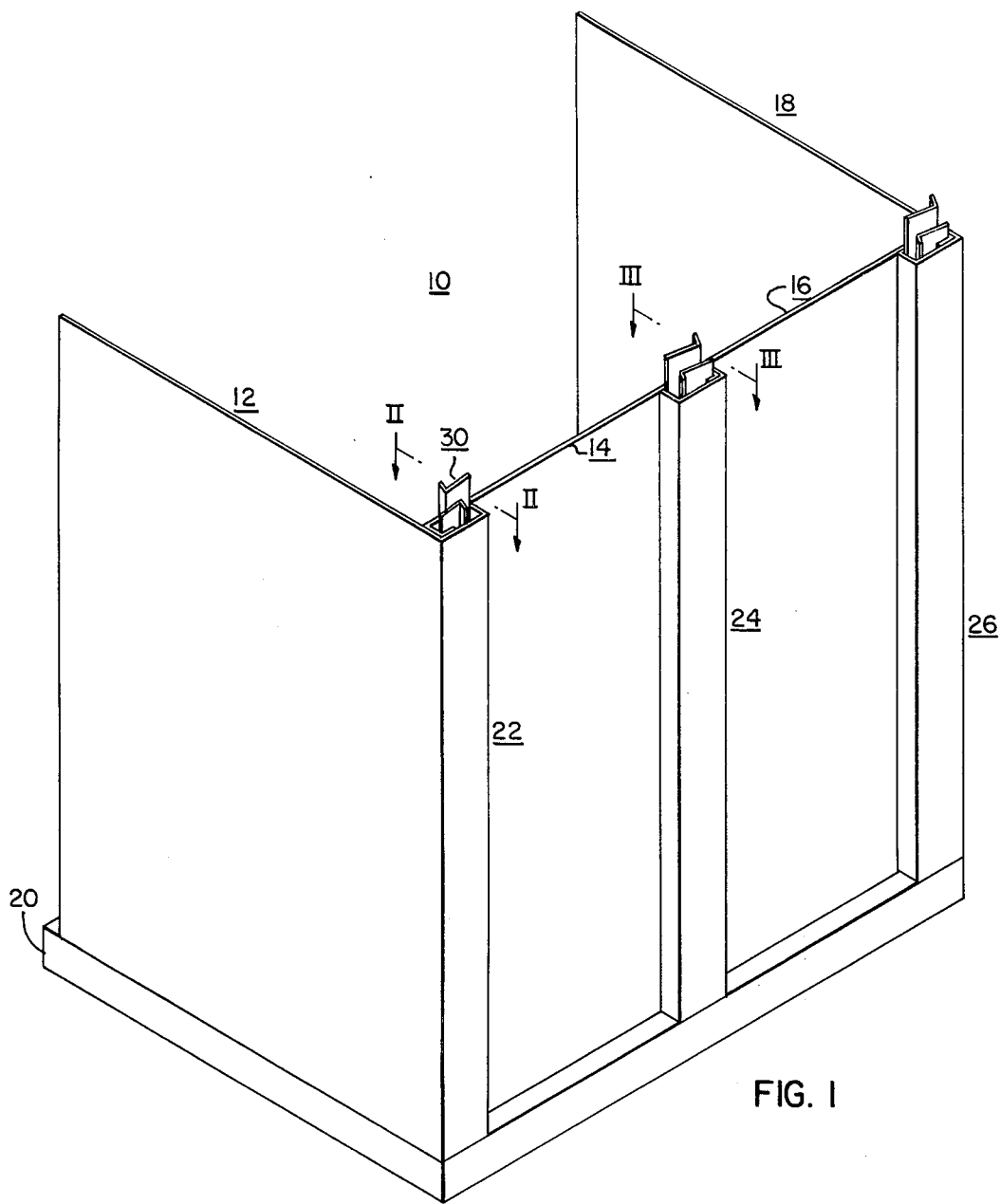
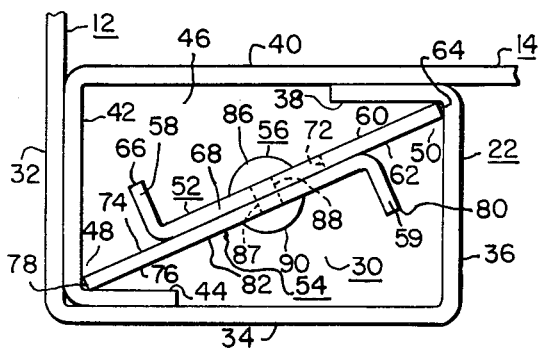
FIG. 2
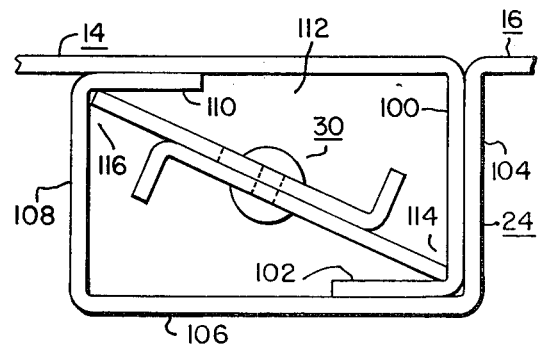
FIG. 3

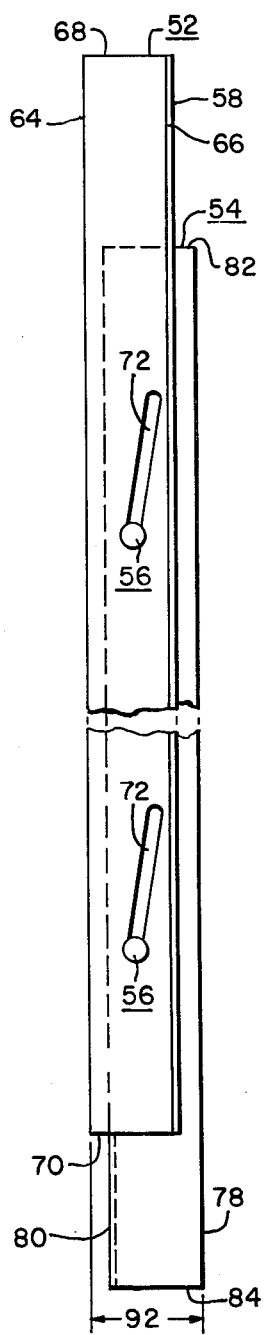
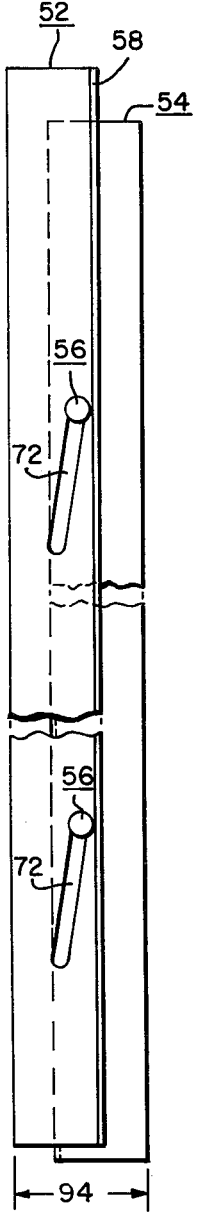
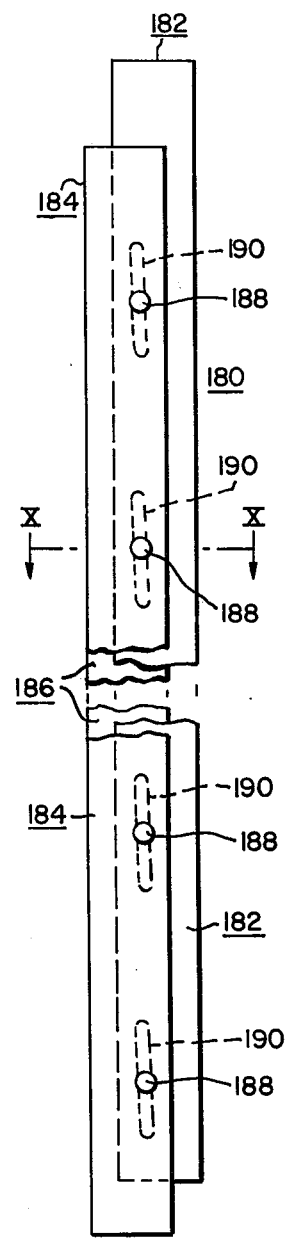
FIG. 4    FIG. 5    FIG. 9
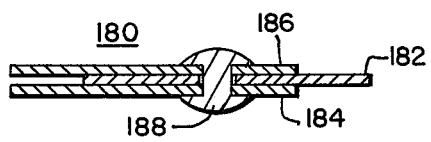
FIG. 10

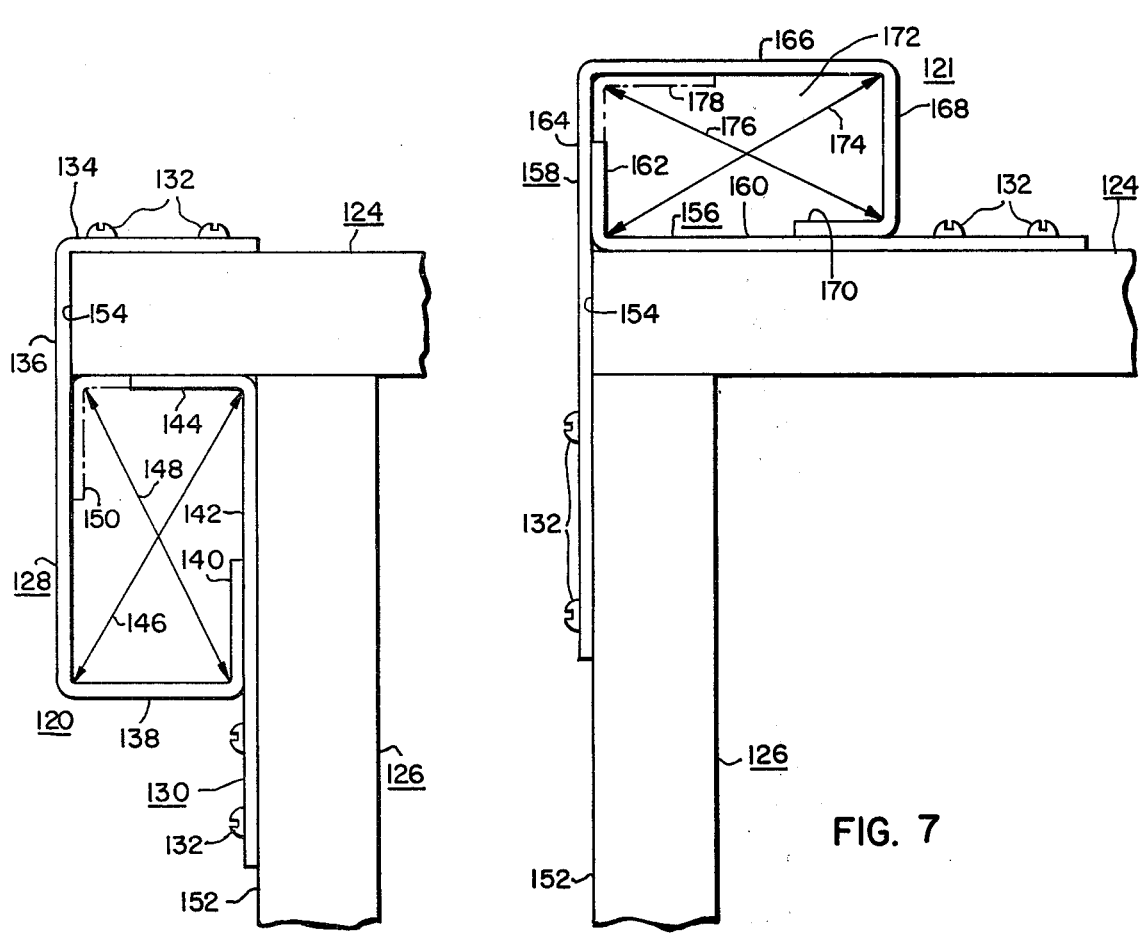
FIG. 6
FIG. 7
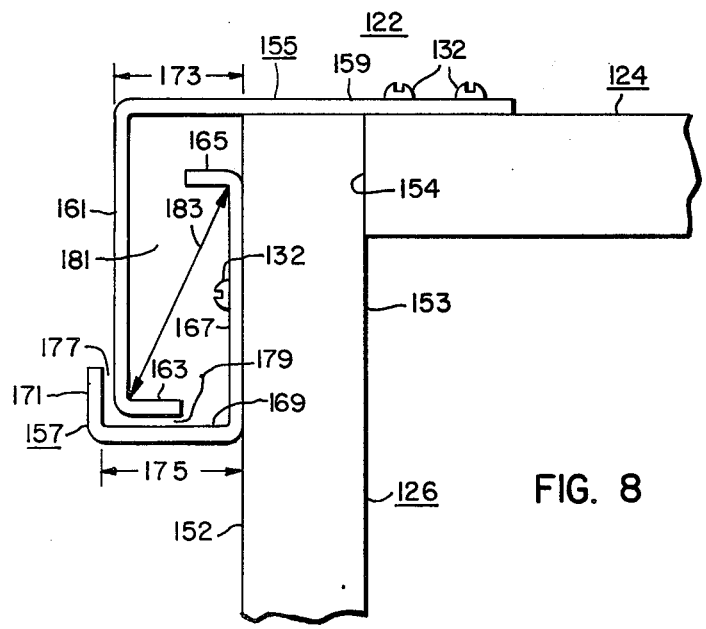
FIG. 8

JOINT FOR INTERCONNECTING PANELS

BACKGROUND OF THE INVENTION

1. Field of the Invention

The invention relates in general to joints, and more specifically to joints between adjoining upstanding panel members.

2. Description of the Prior Art

There are many known arrangements for quickly assembling adjacent panel members. U.S. Pat. No. 1,050,855 discloses rolling the edges of the panel members into beads and joining the beads of adjacent panels with slidable locking caps or strips. U.S. Pat. No. 1,925,417 discloses joining two adjacent panels via telescopically engaged flanges on the edges of the panels to be joined. U.S. Pat. No. 3,204,373 discloses joining the bent edges of two panels via a plurality of channel-shaped spring pieces. U.S. Pat. No. 3,469,873 discloses cooperative grooves at the edges of two panels to be joined, with a flat planar member disposed in the grooves to hold the panels in assembled relation. U.S. Pat. No. 3,596,424 discloses forming interfitting edges on the panels to be joined, which define a vertical passage. A U-shaped locking member is inserted into the vertical passage to hold the panels in assembled relation. U.S. Pat. No. 3,606,411 discloses cooperative bent edges on sheet metal members which are releasably assembled via a stirrup member which straddles the bent edge portions, and a plurality of resilient flexible clips.

In certain applications, the panels to be joined must be joined by personnel working from a single side of the panels, because of space restrictions on the opposite side of the panels. For example, the cab of an elevator car is assembled on a platform supported by a sling. The platform and sling are mounted in the hoistway of a building. Thus, construction personnel must assemble the panels of the cab while standing on the platform.

The elevator cab application also presents an additional challenge to the arrangement used for joining the panels. The elevator cab is constantly subjected to acceleration and deceleration forces, as part of the normal usage thereof. Therefore, the panel joining arrangement must provide tight, squeak-free joints, and the joints must remain tight and squeak-free over the useful operating life of the elevator cab.

Thus, it would be desirable to provide a new and improved joint for interconnecting panels which enables the panels to be quickly and easily joined by personnel located on a single side of the panels. It is further desirable that the joint provide a tight assembly of panels which will retain the original tight interconnection even when the assembled panels are continuously subjected to acceleration and deceleration forces during normal usage thereof.

SUMMARY OF THE INVENTION

Briefly, the present invention is a new and improved joint arrangement for interconnecting panels which includes cooperatively bent members on the adjoining edges of the panels to be joined. The cooperatively bent members are easily coupled by personnel standing on a single side of the resulting joint, to define a vertically extending cavity having a substantially rectangular configuration in horizontal section. An expandable locking device having a length which is substantially the same as the length of the cavity is inserted into the cavity from above. A vertically extending edge of a first elongated plate member of the expandable locking device is disposed adjacent to a corner of the cavity formed by the bent member associated with one of the panel members, and a vertically extending edge of a second elongated plate member of the expandable locking device is disposed adjacent to the diagonally opposite corner of the cavity, which corner is formed by the bent member associated with the remaining panel. The first and second elongated plate or formed members are interconnected such that downward movement of one member relative to the other will increase the spacing or horizontal dimension between their vertically extending edges. Thus, when the locking device is properly aligned in the cavity, one of the elongated plate members is forced downwardly to expand the locking device and apply pressure to the diagonally opposite corners of the cavity. The edges of the first and second elongated plate member contact these two inner corners of the cavity over substantially the complete length of the cavity, providing a substantially uniform pressure along the length of the joint.

BRIEF DESCRIPTION OF THE DRAWING

The invention may be better understood, and further advantages and uses thereof more readily apparent, when considered in view of the following detailed description of exemplary embodiments, taken with the accompanying drawings in which:

FIG. 1 is a perspective view of a plurality of metallic panel members assembled with joints constructed according to the teachings of the invention;

FIGS. 2 and 3 are plan views of two of the joints shown in FIG. 1, taken in the direction of arrows II—II, and III—III, respectively;

FIGS. 4 and 5 are elevational views of a locking device shown in the unexpanded, and in the expanded positions, respectively, which may be used with the joints shown in FIG. 1;

FIGS. 6, 7 and 8 are plan views of joints constructed according to the teachings of the invention, for joining non-metallic panel members;

FIG. 9 is an elevational view of a locking device constructed according to another embodiment of the invention; and FIG. 10 is a cross-sectional view of the locking device shown in FIG. 9, taken between and in the direction of arrows X—X.

DESCRIPTION OF PREFERRED EMBODIMENTS

Referring now to the drawings, and to FIG. 1 in particular, there is shown an assembly 10 of panels 12, 14, 16 and 18. Panels 12, 14, 16 and 18 are assembled on a support structure 20 via a plurality of joints 22, 24 and 26 constructed according to an embodiment of the invention.

Broadly, joints constructed according to the teachings of the invention include cooperatively bent members at the adjoining edges of two panels to be joined, with the bent members being coupled to define a vertically extending cavity having a substantially rectangular configuration in horizontal section. An expandable locking device is inserted into the cavity, which is expanded to continuously exert a pressure along the length of the joint. In the embodiment of FIG. 1, the panels 12, 14, 16 and 18 are formed from a suitable metallic material, such as steel, and thus the bent edges thereof may be integral with the main body of the panel. In another embodiment, to be hereinafter described relative to FIGS. 6, 7 and 8, the panels are formed of non-metallic material, such as wood or a polymeric material. In this latter embodiment, the bent members are formed of metal, such as steel, and they are attached to selected edges of the non-metallic panel members.

Referring again to FIG. 1, and also to FIG. 2 which is a plan view of joint 22 taken in the direction of arrows II—II, the adjoining edges of the metallic panel members 12 and 14 are cooperatively bent, coupled, and locked together with an expandable locking device 30 to provide a right angle joint 22. As shown most clearly in FIG. 2, the bent member on the edge of panel 12 includes a portion 32 in the plane of the panel 12, a portion 34 bent to the right, when viewing FIG. 2, perpendicular to the plane of portion 32, a portion 36 bent upwardly, perpendicular to the plane of portion 34, and a portion 38 bent to the left, perpendicular to the plane of portion 36. The bent member on the edge of panel 14 includes a portion 40 in the plane of panel 14, a portion 42 bent downwardly, perpendicular to portion 40, and a portion 44 bent to the right, perpendicular to portion 42.

The bent members of panels 12 and 14 are easily coupled or assembled by personnel standing on platform 20 to form a vertically extending cavity 46 which has a substantially rectangular configuration in horizontal section. The length of the bent portions may be selected such that the sides of the rectangular-shaped cavity are equal, to form a square cross-sectional configuration, or they may be selected such that the adjacent sides are unequal, as illustrated. The cavity 46 includes a first corner 48 formed between bent portions 42 and 44 of panel 14, and a second corner 50, which is diagonally opposite to corner 48, formed between bent portions 36 and 38 of panel 12. Corners 48 and 50 extend the complete length of the cavity 46.

Locking device 30, which is also shown in FIGS. 4 and 5, includes first and second elongated metallic plate members 52 and 54, respectively, and fastener means 56 which join the plate members 52 and 54 in slidable relation. The metallic plate members 52 and 54 and fastener means may all be formed of steel, or any other suitable metallic material. Elongated plate member 52, which may have a portion 58 bent perpendicular to the major body portion in order to stiffen device 30, has first and second major, flat, parallel opposed surfaces 60 and 62, respectively, first and second vertically extending edges 64 and 66, respectively, and upper and lower ends 68 and 70, respectively. Elongated plate member 52 also includes a plurality of elongated slots 72 formed therein which extend between the first and second major surfaces 60 and 62. The plurality of elongated slots 72 are disposed in spaced relation along the length of the elongated plate member 52. The upper end of each slot is closer to bent portion 58 than is the lower end. In other words, the slots 72 are not vertically oriented but are oriented slightly away from the vertical. The sides of the slots form a predetermined angle with a vertical line drawn through the slot, such as in the range of 3 to 20 degrees. The specific angle selected will depend upon the desired change in the width of the locking device from its unexpanded condition to its expanded condition.

Elongated plate member 54, which may have a portion 50 bent perpendicular to the major body portion to stiffen device 30, has first and second major, flat, parallel opposed surfaces 74 and 76, respectively, first and second vertically extending edges 78 and 80, respectively, and upper and lower ends 82 and 84, respectively. Elongated plate member 54 also includes a plurality of openings 87 for receiving fastener means 56. The fastener means 56 may be any suitable device for holding the elongated plate members 52 and 54 in assembled relation with surface 62 in contact with surface 74, such that one plate member may be moved vertically relative to the other plate member. For example, fastener means 56 may include a relatively large head portion 86, with the head portion exceeding the width of the slot 72, and a shank portion 88. The shank portion 88 is inserted through a slot 72 in member 52 and through an opening 87 in member 54. The end of the shank portion 88 may then be expanded, as shown at 90, to provide an end portion which is larger than the diameter of opening 87.

Locking device 30 is vertically oriented above cavity 46 with the locking device being in the unexpanded condition shown in FIG. 4. In the unexpanded condition, the spacing 92 between its outwardly extending edges 64 and 78 is a minimum. Locking device 30 is then lowered while it is still in the unexpanded condition, with edge 64 being adjacent to corner 50 and edge 78 being adjacent to corner 48. When the bottom end 84 of the second plate member 54 reaches the supporting platform 20, the first plate member 54 is moved downwardly until both edges 64 and 78 are centered with and in contact with the corners 50 and 48, respectively. The upper end 52 may then be struck with a hammer to force it still lower and to force the edges 64 and 78 tightly into the corners 50 and 48, respectively. The parallelogram action of the plate members 54 and 56 maintains edges 64 and 78 parallel with one another while the spacing between the edges is increased to a dimension shown at 94 in FIG. 5, which dimension exceeds the minimum dimension 92 shown in FIG. 4. The wedging action of the edges of the locking device in the diagonally opposite corners creates and maintains the desired tight joint between panels 12 and 14.

Joint 24 shown in FIGS. 1 and 3 illustrates that the teachings of the invention apply to the joining of two aligned panels 14 and 16, as well as to two panels arranged perpendicular to one another. FIG. 3 is a plan view of joint 24 shown in FIG. 1, taken in the direction of arrows III—III. One of the panels, such as panel 14, includes a portion 100 bent downwardly, when viewing FIG. 3, perpendicular to the main body of the panel. It additionally includes a portion 102 bent to the left, perpendicular to portion 100. The other panel, such as panel 16, includes a first portion 104, a second portion 106, a third portion 108, and a fourth portion 110. These portions of bent member 24 are all disposed perpendicular to one another to define three sides of an enclosure, and a part of a fourth side.

Panels 14 and 16 have their bent members assembled to define a cavity 112 having diagonally opposite corners 114 and 116 formed from panels 14 and 16, respectively. Locking device 30 is inserted into cavity 112 as described relative to FIG. 2. Locking device 30 is shown oriented "upside down", compared with the orientation of device 30 in FIGS. 1 and 2, in order to illustrate that it may be used with either orientation.

FIGS. 6, 7 and 8 are plan views of joints 120, 121 and 122, respectively, illustrating that the invention applies to the joining of non-metallic panels, which are thicker than metallic panels. In FIG. 6, a right angle joint is formed between first and second non-metallic panels 124 and 126, respectively. First and second cooperatively bent metallic members 128 and 130 are fastened to the adjoining edges of panels 124 and 126, respectively, such as with screws 132. Bent member 128 includes first, second, third and fourth portions 134, 136, 138 and 140, respectively, each bent to form a right angle with its adjoining portion, and bent member 130 includes portions 142 and 144 bent to form a right angle between them. A locking device 30 locks the cooperatively bent members, with the orientation of device 30, about its vertical axis, being illustrated generally by arrow 146. Device 30 may be oriented as illustrated generally by arrow 148, by forming bent member 130 to include an additional bent portion 150, shown in phantom.

Joint 120 shown in FIG. 6 is formed with panel member 126 engaging panel member 124 with its surface 152 spaced a predetermined dimension from the vertically extending edge 154 of panel 124. Joint 121 shown in FIG. 7 illustrates that panel members 124 and 126 may be arranged such that the side 152 of panel 126 is aligned with the end 154 of panel 124. Panels 124 and 126 include first and second cooperatively bent members 156 and 158, respectively, joined thereto with screws 132. Member 156 includes first and second portions 160 and 162, respectively, and member 158 includes first, second, third and fourth portions 164, 166, 168 and 170, respectively. The panels and their bent members 156 and 158 are assembled to define a cavity 172. A locking device 30 is inserted into the cavity 172 with an orientation shown generally by arrow 174. Th orientation illustrated generally by arrow 176 may be used by forming bent member 156 with an additional bent portion 178, shown in phantom.

The joint 122 shown in FIG. 8 illustrates an especially desirable embodiment of the invention, as it provides and maintains an exceptionally tight joint. Vertical edge 154 of panel 124 is butted against surface 153 of panel 126. Panels 124 and 126 include co-operatively bent metallic members 155 and 157, respectively, joined thereto with screws 132. In this embodiment members 155 and 157 are preferably formed of steel. Member 155 includes first, second and third portions 159, 161 and 163, respectively, and member 157 includes first, second, third and fourth portions 165, 167, 169 and 171, respectively.

Portion 159 of member 155 is fastened to panel 124, and it extends outwardly past surface 152 of panel 126 by a predetermined dimension 173. Portion 161 is oriented parallel to surface 152 of member 126, and portion 163 extends perpendicularly towards surface 152.

Portion 167 of member 157 is fastened to panel 126, portions 165 and 169 extend perpendicularly outward from portion 167, at opposite ends thereof, and portion 171 is bent perpendicular to portion 169, towards member 155. Portion 169 extends outwardly from surface 152 for a dimension 175, which exceeds dimension 173 to provide a predetermined space 177 between portions 161 and 171 of members 155 and 157, respectively. Portion 161 is also preferably dimensioned to provide a predetermined space 179 between portions 163 and 169 of members 155 and 157, respectively.

The assembled panels 124 and 126, and their associated bent members 155 and 157, respectively, define a cavity 181. A locking device 30 is inserted into cavity 181 with an orientation shown generally by arrow 183. When the locking device 30 is expanded it will flex member 155 and force portion 161 outwardly from its unstressed configuration until it contacts portion 171, portion 163 will also be forced out of its unstressed configuration, downwardly towards portion 169. The flexing action pulls panel 124 tightly against panel 126, and it maintains the tight joint due to the natural spring-like characteristic of the flexed member 155. This concept of dimensioning the co-operatively bent members such that one member is stressed by the expandable locking member to provide a continuous urging of one panel member against the other, may be applied to the other embodiments of the invention.

Non-metallic panel members may be joined in alignment with one another, instead of at right angles to one another, by forming metallic bent members in the configurations shown in FIG. 3, and joining them to the non-metallic panel members. While the locking device 30 is preferably constructed from two elongated plate members, the locking device may also be formed of three plate members, if desired. With three plate members, it is unnecessary to bend the plate members in order to increase the stiffness of the resulting assembly. FIG. 9 is an elevational view of a locking device 180 constructed according to a three-plate embodiment of the invention, and FIG. 10 is a cross-sectional view of locking device 180 taken between and in the direction of arrows X—X.

More specifically, locking device 180 includes an elongated plate member 182 sandwiched between first and second elongated plate members 184 and 186. The intermediate panel member 182 includes a plurality of elongated slots 190. The first and second outer elongated plate members 184 and 186 include openings for receiving fastener devices 188. The fastener devices 188 extend through these openings in the plate members and through the slots in the innerplate member, to allow the inner member 182 to be moved up and down, with the central portions of the fastener devices 188 riding in the slots 190.

In summary, there has been disclosed a new and improved joint arrangement for joining panel members, which allows the panel members to be assembled by personnel standing on a single side of the resulting joint. The disclosed joint construction initially provides a very tight joint, and it maintains the tight joint even when the panels are subjected to acceleration and deceleration forces during the normal usage of the assembled panels.

I claim as my invention:

1. A joint between adjacent panels, comprising:
   first and second upstanding panel members having first and second cooperatively bent members, respectively, at adjoining vertical edges thereof,
   said first and second cooperatively bent members being coupled to define a vertically extending, open-ended cavity having a substantially rectangular configuration in horizontal section, predetermined first and second opposite corners of which are formed from the first and second cooperatively bent members, respectively,
   and expandable locking means disposed in said vertically extending cavity,
   said expandable locking means having at least first and second relatively movable plate members defining first and second vertically extending edge portions, respectively, which extend outwardly from opposite sides of said expandable locking means, said first and second edge portions extending along substantially the complete height of said cavity adjacent to the first and second opposite corners of said substantially rectangular configuration, said first and second edge portions increasing their spacing upon predetermined substantially vertical movement of one plate member relative to the other, to cause the first and second edges of the plate members to apply a substantially uniform pressure against the first and second opposite corners of the rectangular configuration, over substantially the complete lengths of the first and second opposite corners, to maintain the first and second panel members in assembled relation.

2. The joint of claim 1 wherein the first and second panel members are disposed at right angles to one another.

3. The joint of claim 1 wherein the first and second panel members are aligned with one another.

4. The joint of claim 1 wherein the first and second panel members are formed of metal and the first and second cooperatively bent members are integral portions thereof.

5. The joint of claim 1 wherein the first and second panel members are formed of a non-metallic material, and the first and second cooperatively bent members are formed of metallic material, with said first and second cooperatively bent members being fixed to the edges of the non-metallic panel members.

6. The joint of claim 1 wherein the expandable locking means includes fastener means which retains the first and second relatively movable plate members in assembled relation while permitting relative movement between the members.

7. The joint of claim 6 wherein the fastener means includes a pin member having first and second ends, with its first end being held captive to the first relatively movable plate member, and wherein the second relatively movable plate member defines an elongated slot which receives said pin member and permits slidable movement of the second plate member relative to the first, the sides of said elongated slot being oriented to cause the first and second vertically extending edge portions of the first and second relatively movable plate members to increase their spacing when one of the members is moved downwardly relative to the other.

8. The joint of claim 1 wherein the first and second cooperatively bent members are dimensioned to cause the expandable locking means to force a portion of one of the bent members to move from its unstressed configuration, against a portion of the other bent member, to provide a spring force which maintains the joint tight.

* * * * *